(12) United States Patent
Gruber et al.

(10) Patent No.: US 6,259,462 B1
(45) Date of Patent: Jul. 10, 2001

(54) METHOD AND APPARATUS FOR TEXTURE BLENDING IN A VIDEO GRAPHICS CIRCUIT

(75) Inventors: Andrew E. Gruber, Arlington; Richard J. Fuller, Lexington, both of MA (US)

(73) Assignee: ATI International SRL, Barbados (KN)

( * ) Notice: Subject to any disclaimer, the term of this patent is extended or adjusted under 35 U.S.C. 154(b) by 0 days.

(21) Appl. No.: 09/208,194

(22) Filed: Dec. 9, 1998

(51) Int. Cl.$^7$ ........................................... G09G 5/37
(52) U.S. Cl. ........................ 345/561; 345/430; 345/552
(58) Field of Search .................................. 345/561, 562, 345/501, 530, 545, 557, 430

(56) References Cited

U.S. PATENT DOCUMENTS

| | | | | |
|---|---|---|---|---|
| 5,724,561 | * | 3/1998 | Tarolli et al. ........................ | 345/523 |
| 5,740,343 | | 4/1998 | Tarolli et al. . | |
| 5,757,377 | * | 5/1998 | Lee et al. ........................... | 345/431 |
| 6,144,365 | * | 11/2000 | Young et al. ........................ | 345/153 |

* cited by examiner

*Primary Examiner*—Kee M. Tung
(74) *Attorney, Agent, or Firm*—Vedder, Price, Kaufman & Kammholz

(57) ABSTRACT

A method and apparatus for blending textures and other operands in a video graphics system using a single blend unit is accomplished through the following steps. A first set of control information is received. A first portion of the first set of control information is sued to select a first blend operand, which is preferably a texture in a graphics processing system. A second blend operand is selected based on a second portion of the first set of control information. The first and second blend operands are combined using an operation selected by a third portion of the first set of control information. The combination of the first and second blend operands produces a first combination result. A second set of control information is received, and a first portion of the second set of control information selects a third blend operand. The first combination result is then selected as a fourth blend operand using a second portion of the second set of control information. The third and fourth blend operands are then provided as inputs to the same combining block utilized for the first combination. A second operation is selected based on a third portion of the second set of control information, and the third and fourth operand are combined based on the second operation to produce a second combination result.

21 Claims, 3 Drawing Sheets

METHOD AND APPARATUS FOR TEXTURE BLENDING IN A VIDEO GRAPHICS CIRCUIT

FIELD OF THE INVENTION

The invention relates generally to graphics processing and more particularly to a method and apparatus for texture blending in a video graphics circuit.

BACKGROUND OF THE INVENTION

Computers are used in many applications. As computing systems continue to evolve, the graphical display requirements of the systems become more demanding. This is especially true in applications where detailed graphical displays must be updated quickly. One example of such an application is a computer game where movement and modification of background images may place great demands on the processing power of the computing system.

In order to display some screen images detailed textures are stored in memory. These textures are then molded and adapted to overlay or map to structures for display. An example is a brick pattern that is mapped to a wall structure, where if the wall is extending into the distance, the texture will be mapped in such a way to show perspective.

Often these textures are modified in ways to further enhance their utility. An example would be the blending of two separate textures to form a new texture. Another example includes modifying the lighting of the texture so as to simulate light coming from a singular source or from multiple sources. In some cases, a single texture may be modified by a number of operations in order to generate a new texture for use.

Multiple modifications to a texture are typically performed using a number of texture blend units. Each of the texture blend units would receive the texture or the product of a previous blend unit and combine it with another input to produce the desired output. The multiple blending units are cascaded to allow a number of different special effects to be applied to a single texture. In order to allow adequate modification of textures, many cascaded blend units may need to be included in the system. Large numbers of blend units add extra circuitry to the system that increases die area, testing requirements, and overall system complexity. All of these factors result in increased costs.

Therefore a need exists for a method and apparatus that allows for texture modification and blend operations to be performed in a simplified manner that utilizes less circuitry.

DETAILED DESCRIPTION OF A PREFERRED EMBODIMENT OF THE INVENTION

Generally, the present invention provides a method and apparatus for blending textures and other operands in a video graphics system using a single blend unit. This is accomplished by receiving a first set of control information where a first portion of the first set of control information is used to select a first blend operand, which is preferably a texture in a graphics processing system. A second blend operand is selected based on a second portion of the first set of control information. The first and second blend operands are combined using an operation selected by a third portion of the first set of control information. The combination of the first and second blend operands produces a first combination result. A second set of control information is received, and a first portion of the second set of control information selects a third blend operand. The first combination result is then selected as a fourth blend operand using a second portion of the second set of control information. The third and fourth blend operands are then fed back through the same combining block utilized for the first combination, and the third and fourth operand are combined based on a second operation to produce a second combination result. The second operation is selected based on a third portion of the second set of control information. By reusing a single blend unit to perform multiple combinations, less circuitry is required to perform multiple operations to a single texture. Decreased circuitry requirements reduces the costs associated with additional die area, testing requirements, and overall complexity.

Figure 1:
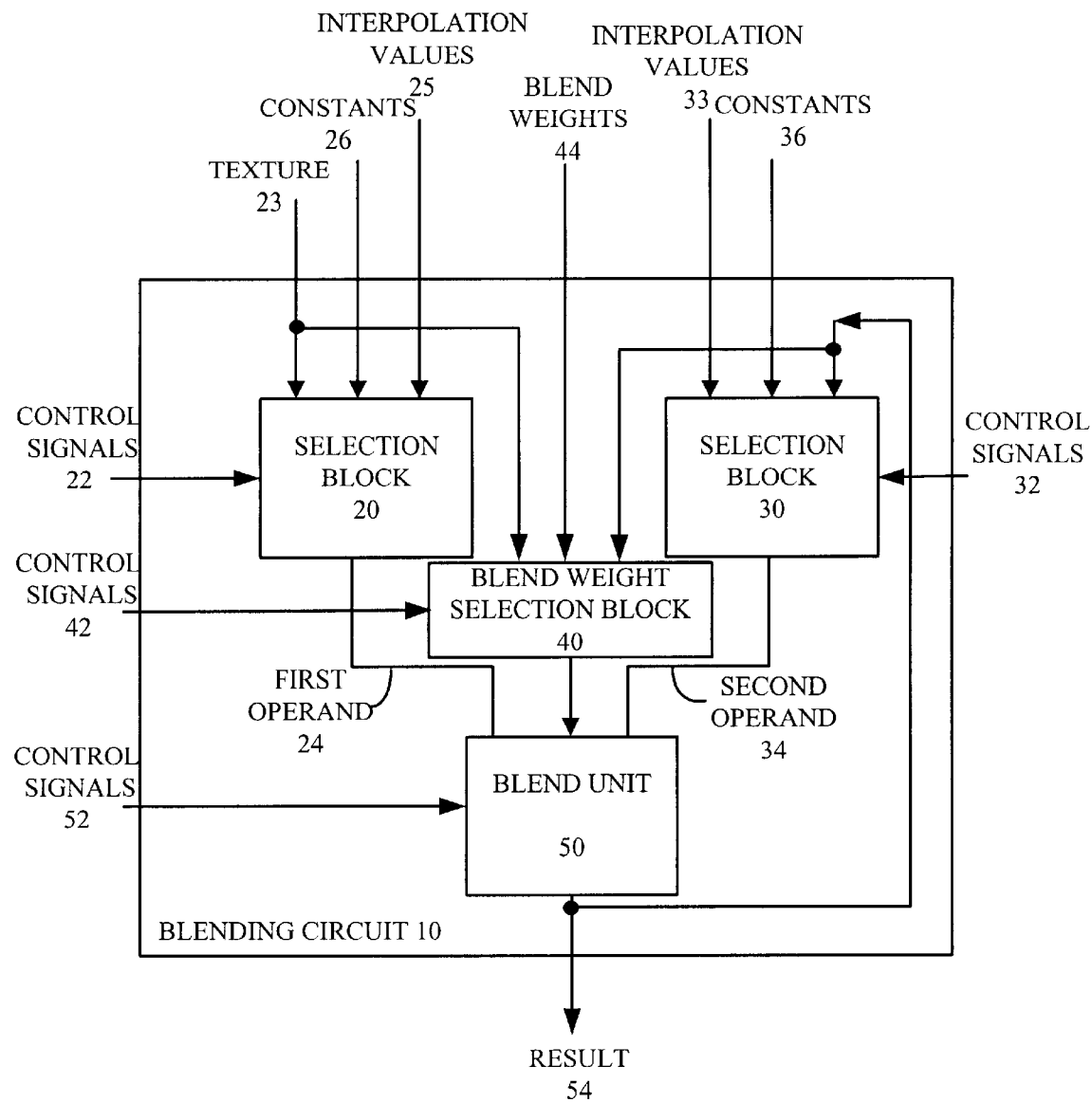
FIG. 1 illustrates a block diagram of a graphics blending circuit in accordance with the present invention.
Figure 2:
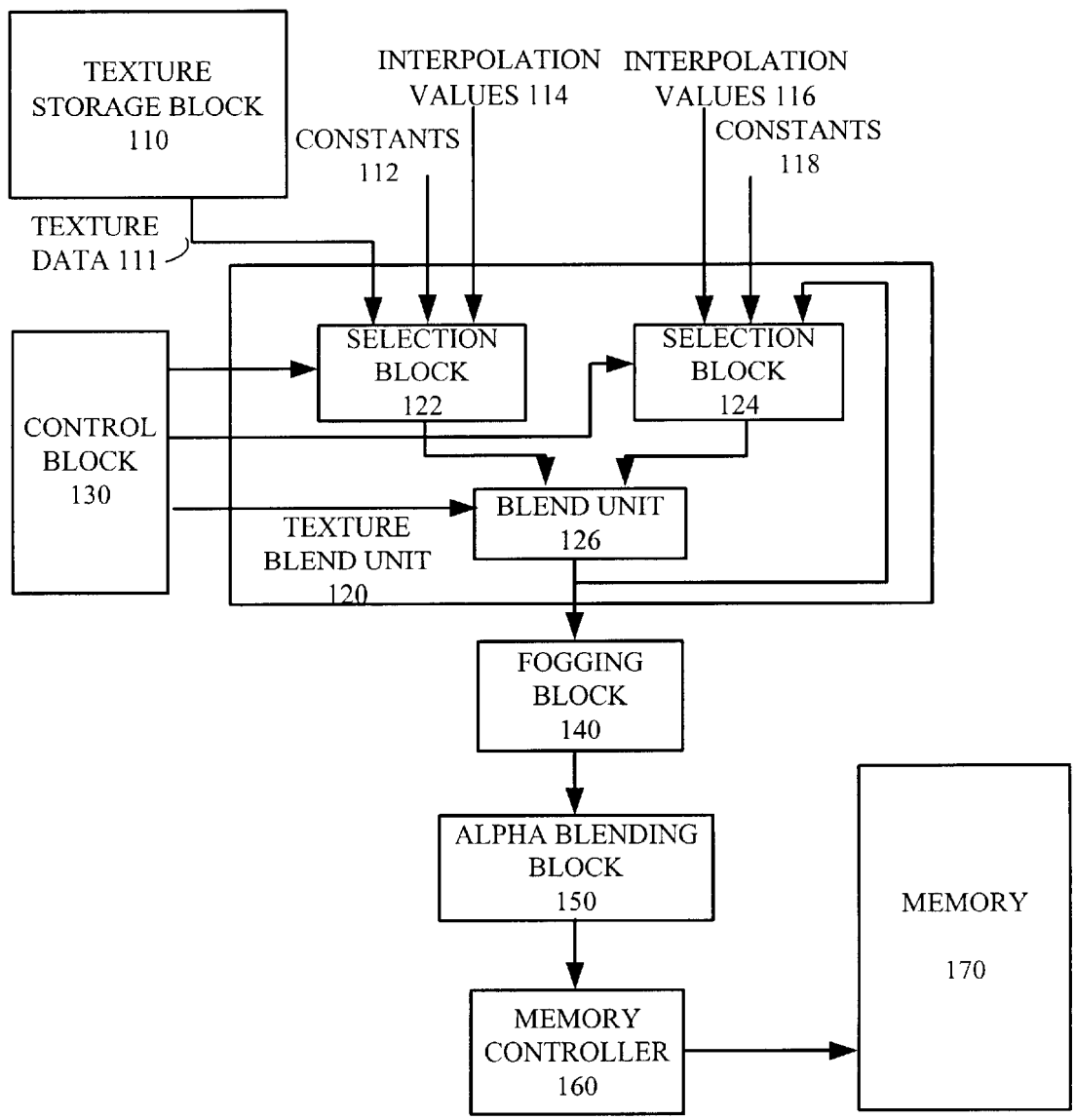
FIG. 2 illustrates a block diagram of a graphics processing circuit in accordance with the present invention.
Figure 3:
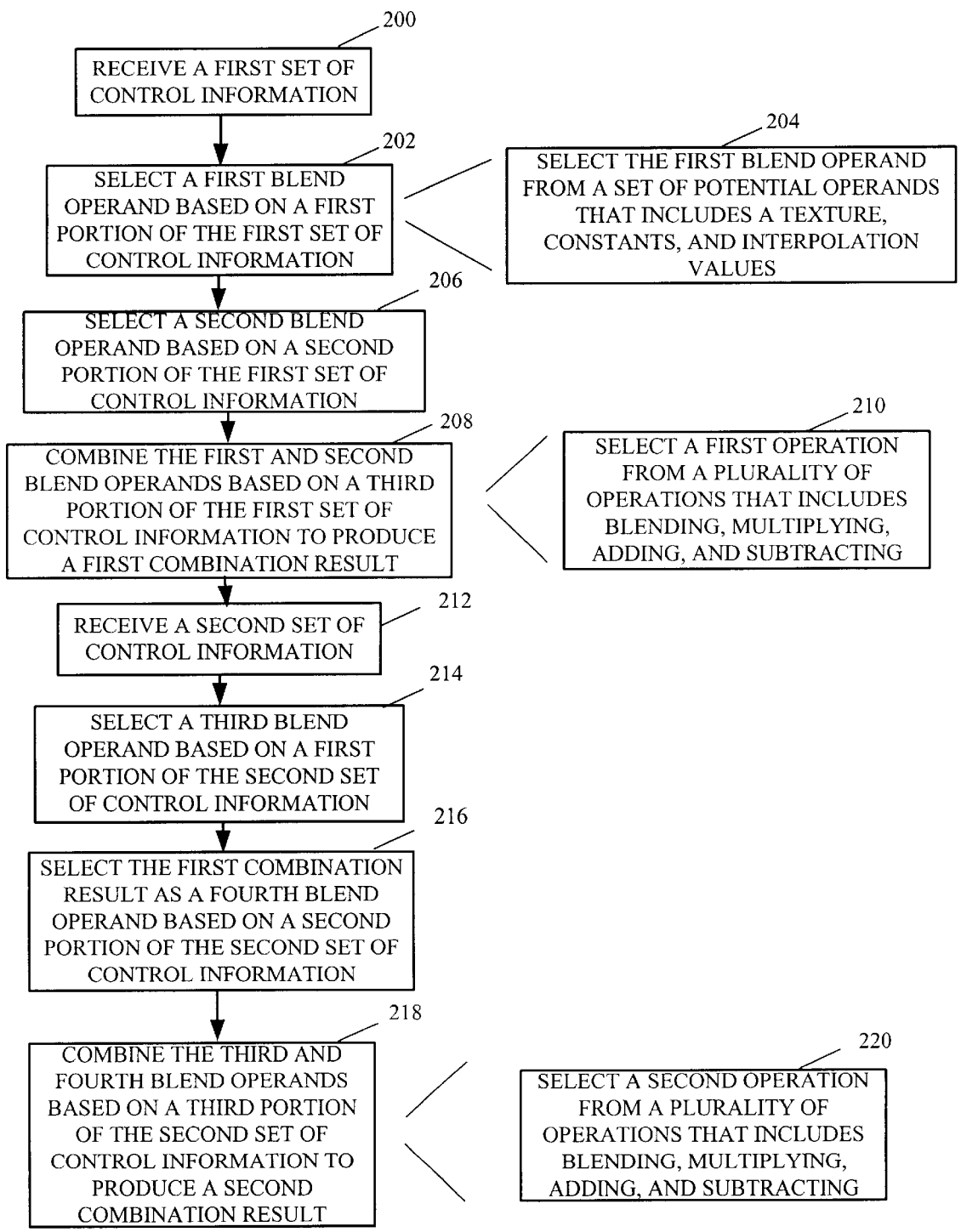
FIG. 3 illustrates a flow chart of a method for combining two operands in a video graphics system in accordance with the present invention.

The invention can be better understood with reference to FIGS. 1–3. FIG. 1 illustrates a blending circuit 10 that includes a selection block 20, a selection block 30, a blend weight selection block 40, and a blend unit 50. The selection block 20 is operably coupled to receive a first plurality of operands, where the operands include a texture 23, constants 26, and interpolation values 25. The number of textures 23, constants 26, and interpolation value 25 that are provided to the selection block 20 may vary based on the particular system implemented. The control signals 22 cause the selection block 20 to select a first operand 24 from the plurality of potential operands that it receives as inputs. Preferably, the selection blocks 20 and 30 are also configured such that the inverse of any of the potential operands may also be selected as an operand.

Similarly, the selection block 30 receives control signals 32 that causes the selection block 30 to select a second operand 36. The potential operands from which selection block 30 selects include interpolation values 33 and constants 36. Interpolation values 33 and constants 36 may be the same or similar interpolation values and constants as are provided to the selection block 20. In addition to these potential operands, the selection block 30 also receives the result 54 as one of its potential operands. When the system has gone through an iteration, the result 54 of the first iteration may be fed back into selection block 30 and selected for the following operation. This allows a single texture to be combined with one additional operand during the first operation and then cycled back through the blending circuit 10 and blended with additional operands in subsequent iterations.

The interpolation values from which the selection blocks 20 and 30 can select are values that have been generated based on interpolation between end points of triangles or other primitives in the system. For example, a triangle would be received which has one color value at each of the three vertices. An interpolator would then interpolate between these three known points to determine the specific color value at different points throughout the triangle.

Similarly, the constants 24 and 34 received by the selection blocks may be constant values which are used to multiply certain values within the texture or may be added to the individual components of the texture. For example, a uniform value may be added to all of the parts within a texture, or a uniform value may be multiplied across the entire texture.

The blend unit 50 receives the first operand 24, the second operand 36, and control signals 52 as inputs. The blend unit 50 combines the first operand 24 and the second operand 34 to produce result 54, where the combinations based on control signals 52. The control signals 52 may be received as part of a control bus or a group of control signals that includes the control signals 22 and 32 that control the selection blocks 20 and 30, and the control signals 42 that control the blend weight selection block 40. The control signals 52 cause the blend unit to select a combining operation from a group of potential operations. Preferably, the potential operations that the blend unit 50 can perform include, but are not limited to, blending, multiplying, adding, subtracting, bypassing an operand such that it is not included in the operation, and signed addition.

It should be obvious to one of ordinary skill in the art that additional selection blocks can be included in the system to provide additional operands to the blend unit 50. The potential operands provided to the additional selection blocks may be the same operands as are available to the first and second selection blocks 20 and 30, or they may include operands that are not available to the other blocks. Preferably, the blend unit 50 can selectively combine the operands that it receives such that additional selection blocks included in the system may or may not be used in each blending operation performed by the blend unit 50. The presence of additional operands allows the blend unit 50 to perform more complex blending operations involving three or more operands, such as: A+(B*C), A*B*2, (A+B)*2, A+B+½, (A+B−½)*2, etc.

When a blend function is selected by the control signals 52, the blend unit 50 will also utilize a selected blend weight when it performs the blend between the first operand and the second operand 34. The blend weight is selected by an additional set of control signals 42 that are provided as inputs to the blend weight selection block 40. Preferably, the blend weight selection block 40 chooses a blend weight from a number of blend weights that include blend weights 44 received from external to the blending circuit, a portion of a texture 23 that indicates a particular blending weight, or a portion of the previous result 54. Thus, the blend weight utilized by the blending unit 50 in a blending operation may be based on the make-up of a particular texture. For example, a certain texture may have a certain color value that is overpowering and thus includes a high blend weight such that when blended with another texture or another color, it will dominate the blending operation.

Thus, a texture received by the selection block 20 may be blended with a texture that has been processed to produce a previous result 54, or may be modified by some arithmetic or other operation which utilizes interpolation values 33, constants 36, or a previous result 54. Note that the interpolation values 33 and constants 36 are not meant to be an exhaustive list of the potential operands that may be utilized by the blend unit 50 in modifying the first operand 24. It should be apparent to one of ordinary skill in the art that any operand that could be arithmetically, logically, or otherwise combined with a texture would be a potential operand in the system described. Similarly, textures are not the only potential graphics operands used in blending operations and other combinations, and any operand which is combined through this type of a combining unit could benefit from the apparatus and method described herein.

In an example operation of the blending circuit 50, a first texture 23 is received by the selection block 20 and selected via the control signals 22. Through this selection, the texture 23 is provided to the blend unit 50 as the first operand 24.

Assume for illustrative purposes that the selection block 30 receives control signals 32 that select one of the constants 36 as the second operand 34. The control signals 52 instruct the blend unit 50 to select an addition operation such that the constant value 36 selected as the second operand 34 is added to the individual points within the texture 23. The product of the operation is provided as result 54.

Continuing with the example, assume that additional modifications to the texture are desired. Because the result 54 is provided as an input to the selection block 30, it can be selected via control signals 32 as the second operand 34 for an additional operation. Therefore, the texture, which was already modified by adding a constant value, can be blended with an additional texture. In order to do this, the control signals 22 are be asserted such that the selection block 20 selects a newly received texture 23 as the first operand 24. The control signals 52 are asserted such that the blend unit 50 selects a blending operation and blends the first operand 24, which is the new texture, and the second operand 34, which is the previous result 54. The result produced by each blending operation can be repeatedly used as an operand in the system perform multiple blending iterations on the same operand. As stated earlier, the blend operation may take into consideration a blend weight provided by the blend weight selection block 40. The blend weight is preferably determined based on control signals 42.

In the example given, a first texture may initially be modified by a constant, and then blended with a second texture to produce a resultant texture that is a combination of the two textures. A practical application for this example is in the situation where a background or other portion of the display is gradually changed from one type of texture to another. In such a case, the blend unit 50 could continuously blend the previous result with the new texture which is to be displayed, while continuously varying the weight of the blending thus one texture would be gradually be fazed out as the other texture is gradually fazed in. Such an operation is easier to accomplish utilizing the unified blending circuit 10 illustrated rather than using previous cascaded systems that included multiple blending circuits.

FIG. 2 illustrates a graphics processing circuit that includes a texture blend unit 120 that is preferably similar to the blending circuit 10 of FIG. 1. The graphics processing circuit illustrated in FIG. 2 includes a control block 130, a texture storage block 110, the texture blend unit 120, a fogging block 140, an alpha blending block 150, a memory controller 160, and a memory 170. Preferably the circuit illustrated is used to retrieve stored texture data, modify that texture data and then store into memory 170 for use in generating a display signal.

The texture storage block 110 provides texture data 111 to the texture blend unit 120. The texture storage block 110 may include a texel addressing unit and a texel cache, where the texel addressing unit generates addresses which are fed to a memory to retrieve texels that are then stored in the texels cache. Texels retrieved from the memory are stored in the texel cache and gradually fed to the texture blend unit 120 as texture data 111.

The control block 130 generates control signals that determined the type of operation performed by the texture blend unit 120. A first set of control signals from the control block 130 is provided to the selection block 122 of the texture blend unit 120. The selection block 122 selects from the texture data 111, a set of constants 112, and a set of interpolation values 114. The constants 112 and the interpolation values 114 are similar to the types of constants and interpolation values described with respect to FIG. 1.

The control block 130 feeds a second set of control signals to the selection block 124 which selects from a set of interpolation values 116, a set of constants 118, and the previous result produced by the blend unit 126. The selection blocks 122 and 124 provide a pair of operands to the blend unit 126 based on the selection performed by each selection block. The control block 130 provides a third set of control signals to the blend unit 126, and the third set of control signals instruct the blend unit to combine the two operands received to produce a resultant value. The type of operation performed by the blend unit 126 is determined based on the control signals received from the control block 130. As before, the types of operations which the blend unit 126 may perform include a blend operation, which might include a weighted blending; a multiply operation; an addition operation; a subtraction operation; a division operation; and other types of logical, arithmetic, or blending operations that would be performed using the operands provided.

Thus, texture data 111 received from the texture storage block 110 may be selected and processed by the texture blend unit 120 a number of times such that the texture data 111 is modified by a number of different interpolation values, constants, or additional textures that may be received from the texture storage block 110. The control of these operations is performed by the control block 130. The result produced by the texture blend unit 120 may then be further modified by one or more of the fogging block 140, the alpha blending block 150, or a number of other operation blocks that would modify the type of data produced by the texture blend unit 120. The fogging block 140 may simulate a fogging effect on the resulting texture, thus simulating the lack of clarity or haziness that might be associated with looking at something through a fog. Similarly, the alpha blending block 150 can simulate some type of transparency or translucency on the part of the texture. For example, there may be a portion of the display which although has a texture map to it, it is somewhat translucent. An example might be colored or stained glass that has additional imagery located behind it.

After any additional processing by the fogging block 140 or the alpha blending block 150, the modified texture data is provided to the memory controller 160, which stores the texture in the memory 170. The memory 170 may be the frame buffer of a video graphics integrated circuit, or any other type of memory structure that stores the texture data for use. Preferably, the memory 170 is synchronous dynamic random access memory (SDRAM), but it may be comprised of many other types of read/write memory that are well known in the art.

FIG. 3 illustrates a method for combining two operands in a video graphics system, where one of the operands is preferably a texture used in drawing graphics images. At step 200, a first set of control information is received. At step 202, a first portion of the first set of control information is used to select a first blend operand. Preferably, at step 204, the first blend operand is selected from a set of potential blend operands that includes a texture, a set of constants, and a set of interpolation values. When the operand is a texture, the data describing the texture may be texture color data such as the RGB values for each texel in the texture. In other instances, the texture data may include texture alpha data that determines the translucent properties of each texel within the texture. Some sets of texture data will include both the color data and the alpha data in a single block of texture data.

It should be apparent to one of ordinary skill in the art that additional blend operands may be desirable in a video graphics system, and it would be straightforward to add these potential operands to the method disclosed herein. Preferably, the operand selection is configured such that the inverse of any of the potential operands may also be selected. Thus, the inverse of any constant, interpolation value, or texture may be selected as any one of the operands in the system.

At step 206, a second blend operand is selected using a second portion of the first set of control information. The second blend operand may be selected from a group of potential operands similar to that provided for the selection of the first blend operand. At step 208, the first and second blend operands are combined based on a third portion of the third set of control information to produce a first combination result. Preferably, the third portion of the first set of control information is used to select the operation that combines the first and second blend operands. At step 210, a first operation is selected as the combining operation from a plurality of potential operations. This plurality of potential operations includes blending, multiplying, adding, subtracting, and dividing.

At step 212, a second set of control information is received. At step 214, a third blend operand is selected based on a first portion of the second set of control information. Preferably, the selection of the third blend operand is performed by the same circuitry as was utilized to select the first blend operand at step 202. Similarly, at step 216, a fourth blend operand is selected. However in this case, the fourth blend operand is selected from a group of potential blend operands that includes the first combination result produced at step 208. The fourth blend operand is selected based on a second portion of the second set of control information.

Thus, the result produced by combining the first and second blend operands may be selected at step 216 such that it can be combined with the third selected blend operand to produce a second combination result. This occurs at step 218, where the third operand and the fourth operand are combined based on a third portion of the second set of control information. As was described for step 210, the second operation which combines the third and fourth operands may be selected from a set of potential operations that includes blending, multiplying, adding, subtracting, dividing, etc. As described earlier, if more than two operands are to be combined at the combination step, more complex multi-operand combination are possible. If a blending operation is selected and performed at step 208 or step 218, a blend weight factor may be included in the combination operation such that one of the operands is combined with a greater weight than the other operand. It should be apparent to one of ordinary skill in the art that additional operations that combine the operands may be included based on the particular needs of the system.

The combination performed at step 218 is preferably performed by the same circuitry that performs the combination at step 208. Thus, by utilizing a single combining block to perform iterative modifications of textures or other operands, the method and apparatus described herein overcome the additional complexity and circuitry required by prior art solutions that utilized multiple blending or combination units.

Preferably, the system allows for the separation of the color and alpha components for a particular texture such that separate operations can be performed on each of the components. This may involve including buffers in the system to store portions of the texture while other portions are used in blending operations, or it may involve including additional blend units or a blend unit that receives separate control information for alpha and color portions of the texture such that separate operations can occur in parallel. This type of implementation could utilized to produce a result that is a combination of the alpha and color portions of a texture, where each has been modified by separate constants or interpolation values.

For example, a first iteration through the system produces a first color result that adds a constant to the color portion of a texture. The first alpha result multiplies the alpha portion of the texture by an interpolation value. The second iteration through the system then produces a second color result that is the product of the first color result and the first alpha result, and the second alpha result performs an additional operation on the first alpha result. Providing the feedback path that allows a previous result of the blend unit to be repeatedly combined with additional operands in a flexible fashion allows a wide range of combination possibilities without increasing the hardware required to perform the combinations.

It should be understood that the implementation of other variations and modifications of the invention and its various aspects will be apparent to those of ordinary skill in the art, and that the invention is not limited to the specific embodiments described. For example, a plurality of the blending units described within the application may be implemented in a single integrated circuit such that a number of the blending operations described may be performed in parallel. It is therefore contemplated to cover by the present invention, any and all modifications, variations, or equivalents that fall within the spirit and scope of the basic underlying principles disclosed and claimed herein.

What is claimed is:

1. A method for combining two operands in a video graphics system, comprising:

receiving a first set of control information;

selecting a first blend operand based on a first portion of the first set of control information;

selecting a second blend operand based on a second portion of the first set of control information;

combining the first blend operand and the second blend operand based on a third portion of the first set of control information, wherein combining produces a first combination result;

receiving a second set of control information;

selecting a third blend operand based on a first portion of the second set of control information;

selecting the first combination result as a fourth blend operand based on a second portion of the second set of control information; and combining the third blend operand and the fourth blend operand based on a third portion of the second set of control information to produce a second combination result.

2. The method of claim 1, wherein selecting each of the blend operands further comprises selecting from a set of potential operands, wherein the set of potential operands includes a texture.

3. The method of claim 2, wherein selecting a blend operand further comprises selecting from the set of potential operands, wherein the set of potential operands further includes at least one constant and at least one interpolation value.

4. The method of claim 1, wherein selecting a blend operand further comprises selecting from a set of potential operands, wherein the set of potential operands includes texture color data and texture alpha data.

5. The method of claim 1, wherein selecting a blend operand further comprises selecting an inverse of a potential operand.

6. The method of claim 1, wherein combining the first and second operands further comprises combining based on a first selected operation selected from a plurality of operations based on the third portion of the first set of control information, and wherein combining the third and fourth operands further comprises combining based on a second selected operation selected from the plurality of operations based on the third portion of the second set of control information, wherein the plurality of operations includes: blending, multiplying, and adding.

7. The method of claim 1, wherein both the step of combining the first and second operands and the step of combining the third and fourth operands are performed in one combining unit.

8. A graphics blending circuit comprising:

a first selection block, wherein the first selection block is operably coupled to receive a first plurality of operands and a first set of control signals, wherein the first selection block selects a first operand from the first plurality of operands based on the first set of control signals;

a second selection block, wherein the second selection block is operably coupled to receive a second plurality of operands and a second set of control signals, wherein the second selection block selects a second operand from the second plurality of operands based on the second set of control signals, wherein the second plurality of operands includes a result; and a blend unit operably coupled to the first selection block and the second selection block, wherein the blend unit receives a third set of control signals, wherein the blend unit combines the first operand and the second operand to produce the result.

9. The graphics blending circuit of claim 8, wherein the first plurality of operands includes a texture, a first set of interpolation values, and a first set of constants.

10. The graphics blending circuit of claim 8, wherein the second plurality of operands further includes a second set of interpolation values and a second set of constants.

11. The graphics blending circuit of claim 8, wherein the blend unit selects an operation from a plurality of operations based on the third set of control signals, wherein the blend unit combines the first and second operands using the operation, wherein the plurality of operations includes blending, multiplying, and adding.

12. The graphics blending circuit of claim 8, wherein the first selection block includes inverting circuitry such that inverse values of the first plurality of operands are potential selections for the first operand, and wherein the second selection block includes inverting circuitry such that inverse values of the second plurality of operands are potential selections for the second operand.

13. The graphics blending circuit of claim 8 further comprises a blend weight selection block operably coupled to the blend unit, wherein the blend weight selection block selects a blend weight based on a fourth set of control signals, wherein the blend unit combines the first and second operands using the blend weight such that a weighted combination is produced as the result.

14. The graphics blending circuit of claim 8 further comprises at least one additional selection block operably coupled to the blend unit, wherein the at least one additional selection block is operably coupled to receive an additional plurality of operands and an additional set of control signals, wherein the at least one additional selection block selects at least one additional operand from the additional plurality of operands based on the additional set of control signals, wherein the blend unit selectively combines the first operand, the second operand, and the at least one additional operand to produce the result.

15. A graphics processing circuit comprising:

a control block that produces control signals;

a texture storage block, wherein the texture storage block stores a texture; and a texture blend unit operably coupled to the texture storage block and the control block, wherein the texture blend unit includes:

a first selection block, wherein the first selection block is operably coupled to receive a first plurality of operands and a first set of control signals, wherein the first plurality of operands includes the texture, wherein the first selection block selects a first operand from the first plurality of operands based on the first set of control signals;

a second selection block, wherein the second selection block is operably coupled to receive a second plurality of operands and a second set of control signals, wherein the second selection block selects a second operand from the second plurality of operands based on the second set of control signals, wherein the second plurality of operands includes a resulting texture; and a blend unit operably coupled to the first selection block and the second selection block, wherein the blend unit receives a third set of control signals, wherein the blend unit combines the first operand and the second operand to produce the resulting texture.

16. The graphics processing circuit of claim 15 further comprises a fogging block operably coupled to the texture blend unit, wherein the fogging block adds fogging effects to the resulting texture to produce a fogged texture.

17. The graphics processing circuit of claim 15 further comprises an alpha blending block operably coupled to the texture blend unit, wherein the alpha blending block adds translucent effects to the resulting texture to produce an alpha blended texture.

18. The graphics processing circuit of claim 15 further comprises:

a memory; and a memory controller operably coupled to the texture blend unit and the memory, wherein the memory controller stores the resulting texture in the memory.

19. The graphics processing circuit of claim 15, wherein the first plurality of operands further includes a first set of interpolation values and a first set of constants.

20. The graphics processing circuit of claim 15, wherein the second plurality of operands further includes a second set interpolation values and a second set of constants.

21. The graphics processing circuit of claim 15, wherein the blend unit selects an operation from a plurality of operations based on the third set of control signals, wherein the blend unit combines the first and second operands using the operation, wherein the plurality of operations includes blending, multiplying, and adding.

* * * * *